United States Patent [19]
Silverberg et al.

[11] Patent Number: 6,016,205
[45] Date of Patent: Jan. 18, 2000

[54] INK-JET COPIER IN WHICH AN ORIGINAL IMAGE IS PRESCANNED FOR OPTIMIZED PRINTING

[75] Inventors: Morton Silverberg, Westport, Conn.; George J. Roller, Penfield, N.Y.

[73] Assignee: Xerox Corporation, Stamford, Conn.

[21] Appl. No.: 08/916,499

[22] Filed: Aug. 22, 1997

[51] Int. Cl.⁷ .................................................. B41B 15/00
[52] U.S. Cl. ............................ 358/1.6; 358/486; 358/426
[58] Field of Search .................................. 395/105, 106, 395/109; 358/298, 261.3, 438, 1.6, 426, 486

[56] References Cited

U.S. PATENT DOCUMENTS

| | | | |
|---|---|---|---|
| 3,428,744 | 2/1969 | Green et al. | 358/486 |
| 3,730,988 | 5/1973 | Shimizu | 178/6.8 |
| 3,769,631 | 10/1973 | Hill et al. | 346/75 |
| 4,302,781 | 11/1981 | Ikeda et al. | 358/288 |
| 4,631,598 | 12/1986 | Burkhardt et al. | 358/280 |
| 4,873,577 | 10/1989 | Chamzas | 358/426 |
| 5,414,453 | 5/1995 | Rhoads et al. | 347/8 |
| 5,519,514 | 5/1996 | TeWinkle | 358/514 |
| 5,532,839 | 7/1996 | Beikbirch et al. | 358/401 |
| 5,550,653 | 8/1996 | TeWinkle et al. | 358/514 |
| 5,563,591 | 10/1996 | Jacobs et al. | 341/13 |
| 5,568,269 | 10/1996 | Jamzadeh | 358/298 |
| 5,687,009 | 11/1997 | Walsh et al. | 358/486 |

FOREIGN PATENT DOCUMENTS

| | | |
|---|---|---|
| 0 079 208 | 11/1982 | European Pat. Off. . |
| 0 655 854 A1 | 11/1994 | European Pat. Off. . |
| 0 785 666 A2 | of 1997 | European Pat. Off. . |
| 35 40 875 A1 | 5/1986 | Germany . |

*Primary Examiner*—Amelia Au
*Assistant Examiner*—F. Cooperrider
*Attorney, Agent, or Firm*—R. Hutter

[57] ABSTRACT

In a digital copier in which the copies are made with a reciprocating ink-jet printhead, the original image to be copied is pre-scanned at high speed and low resolution, to identify an area in the original image having white space. If the white-space area in the original image is sufficiently large, the action of the printhead can be adapted to skip the corresponding area in the copy sheet in the printing process, thus increasing the overall throughput of the digital copier. An analogous technique can be used to identify non-halftone or non-color portions of an original image, which can be printed with fewer than a maximum number of passes of the printhead over a specific area of the copy sheet.

3 Claims, 1 Drawing Sheet

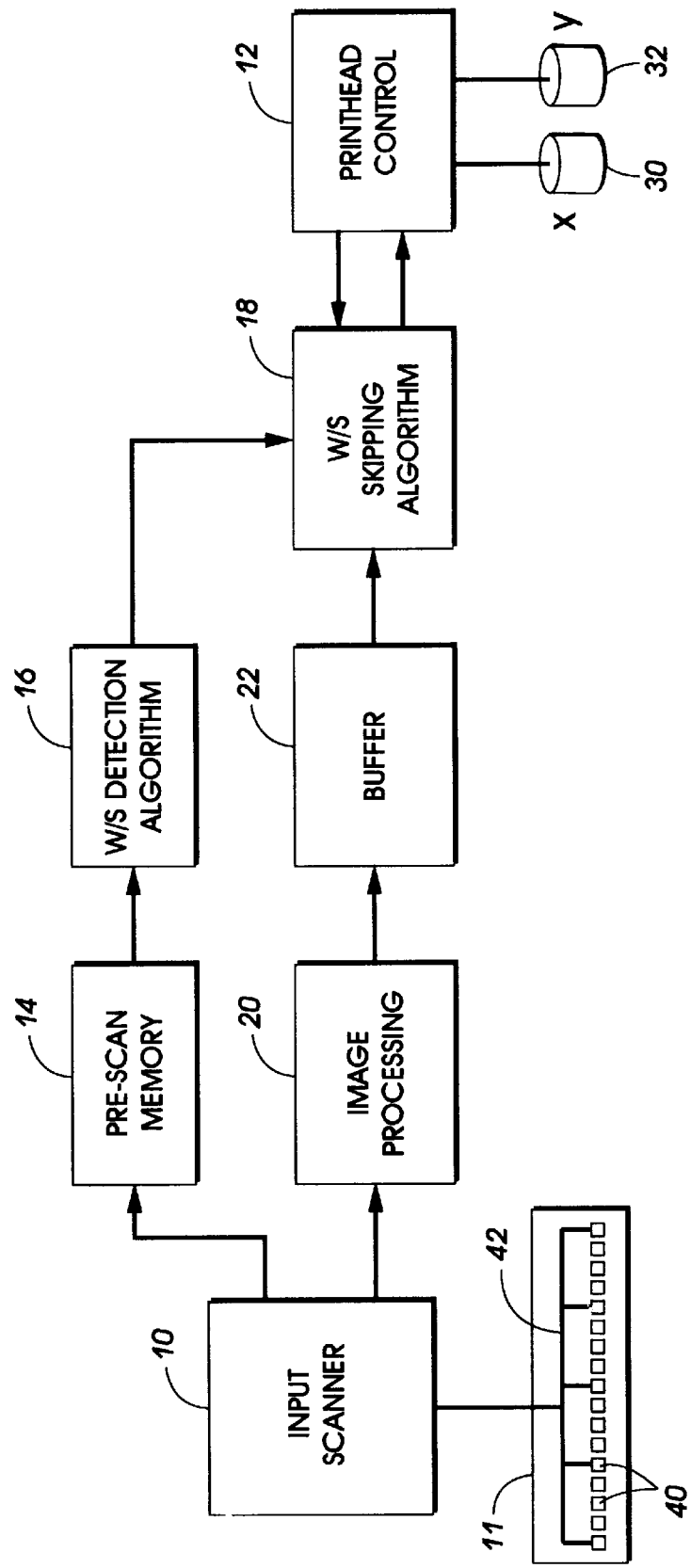

INK-JET COPIER IN WHICH AN ORIGINAL IMAGE IS PRESCANNED FOR OPTIMIZED PRINTING

FIELD OF THE INVENTION

The present invention relates to ink-jet digital printing in which the original image to be printed is derived from a hard-copy original placed on a platen, as in a copier.

BACKGROUND OF THE INVENTION

In thermal ink-jet printing, droplets of ink are collectively emitted from a plurality of drop ejectors in a printhead, in accordance with digital instructions, to create a desired image on a sheet. In most current designs of an ink-jet printer, the printhead is relatively small compared to the size of a sheet on which an image is printed, and the printhead is caused to reciprocate relative to the sheet, with the sheet being indexed a short distance with every pass, or following a certain number of passes, of the printhead.

Because of the relatively small size of a commercial printhead relative to a sheet (a linear array being typically 2 cm or shorter in length), any small advantage in improving the speed of outputting sheets is desirable. One well-known technique familiar in the art of ink-jet printing is called "white space skipping." With white space skipping, any "white" areas in the image (i.e., portions of an image in which no ink is intended to be placed) are pre-identified from the original image data, and can thus be skipped entirely by the moving printhead. For example, assuming the printhead reciprocates across the short direction relative to a letter-sized sheet printing out a portrait-oriented image, any white space at the top or the bottom of the image (such as the margins of a letter) can simply be passed through the apparatus quickly without the printhead passing over these areas at all. Similarly, if there is a sufficiently large white space on one particular side of the image (such as if there are wide right or left margins), the printhead can be caused to change direction before reaching the end of the sheet. In short, if it is known in advance that no portion of the image is to be printed in a certain place, the printhead need not pass over that part of the sheet having only white area, or, alternately, the printhead can pass over the white space at a speed higher than would be suitable if the printhead were depositing ink in the area; for purposes of the claims hereinbelow, either technique can fall under the rubric of "skipping."

White space skipping is made possible in the context of printing an image based on original data derived from a computer, because this digital data will inherently hold "clues" which the control system of the printer can use to detect large white spaces in the image to be printed. For example, page description languages, such as PostScript™, facsimile protocols such as Group 3, or in some cases JPEG-compressed data, can contain short codes, or markers, which indicate that a certain area within the image to be printed is white; these markers can be exploited to cause the printhead to skip certain areas. A problem arises, however, if the basic digital printing apparatus is used as part of a digital ink-jet copier, in which the image to be printed is derived not from original computer data, but rather from an original hard-copy image which is scanned from a platen or other input scanning device, such as part of a facsimile. The problem with such original image data is that, unlike computer-originated images, the data inherently includes no "clues" to facilitate white-space skipping when the copies are printed.

An object of the present invention is to provide a system which enables the speed advantages of white-spaced skipping in an ink-jet-based copier.

DESCRIPTION OF THE PRIOR ART

U.S. Pat. No. 3,769,631 is an early ink-jet-printing patent which describes the general principle of "white-space skipping."

U.S. Pat. No. 5,414,453 discloses a color ink-jet printing apparatus in which the reciprocating printhead can be moved to a first position relative to the paper for all-black printing, and to a second position for full-color printing. The printhead position is controlled by monitoring the image data to detect where black-only and full-color portions of the images are disposed; this detection is carried out by dividing the image data by a grid which separates the image into small areas, as described at column 10, lines 36–52.

U.S. Pat. No. 5,519,514 discloses a color photosensor array for scanning documents, in which different arrays, each sensitive to a different primary color, have different integration times, i.e., exposure time relative to a small area of the original image, so that the optical "center of gravity" for each exposed area in the original image is superimposed for all of the primary color photosensor arrays.

U.S. Pat. No. 5,532,839 discloses an input scanner, such as for a digital copier, which allows for the elimination of scanning duplicate images within a single job. Duplicate images are detected by performing a checksum operation on certain cell areas within the original image data.

U.S. Pat. No. 5,550,653 discloses an input scanner adapted for efficient scanning of simple "business color" documents. Three linear arrays of photosensors, each corresponding to one primary color, are moved relative to the original image. One linear array operates on a full cycle and converts every single scan line of the original image into digital signals, while the other linear arrays operate on half cycles and record only signals corresponding to an evenly-distributed subset of small areas of the original image.

U.S. Pat. No. 5,563,591 discloses an ink-jet printing appartaus having a reciprocating printhead in which a an encoder panel includes fiducial marks which are monitored by a photosensor on the printhead, to control the precise position and motion of the printhead. In this patent, the encoder panel is itself in the form of an LCD display, which enables the fiducial marks to be altered as needed to control the printhead behavior, such as for white-space skipping.

SUMMARY OF THE INVENTION

According to one aspect of the present invention, there is provided a method of operating a digital copier having an input scanner for scanning an original image, an ink-jet printhead, and a printhead control for moving the printhead relative to a copy sheet and causing the printhead to deposit ink at a predetermined location on the copy sheet. The original image is scanned to yield low-resolution image data. Based on the low-resolution image data, areas of contiguous white space of a predetermined minimal size in the original image are identified. The original image is further scanned to yield high-resolution image data. A copy of the original image is printed on the copy sheet with the printhead, based on the high-resolution image data. The printhead control causes the printhead to skip a location on the copy sheet corresponding to an identified area of contiguous white space of a predetermined minimal size in the original image.

According to another aspect of the present invention, there is provided a method of operating a digital copier having an input scanner for scanning an original image, an ink-jet printhead, and a printhead control for moving the printhead relative to a copy sheet and causing the printhead to deposit ink at a predetermined location on the copy sheet, the printhead control further adapted to selectably cause the printhead to pass a predetermined number of times over an area of the copy sheet to render an image thereon. The original image is scanned to yield low-resolution image data. Based on the low-resolution image data, an area of contiguous space of a predetermined minimal size in the original image is identified, said area of contiguous space requiring the printhead to pass fewer than said predetermined number of times over a location on the copy sheet to render the image in the area on the copy sheet. The original image is further scanned to yield high-resolution image data. A copy of the original image is printed on the copy sheet with the printhead, based on the high-resolution image data. The printhead control causes the printhead to pass fewer than said predetermined number of times over a location on the copy sheet corresponding to the area of contiguous space in the original image.

BRIEF DESCRIPTION OF THE DRAWING

The FIGURE is a systems diagram showing the essential elements of the present invention, as incorporated in an ink-jet-based digital copier.

DETAILED DESCRIPTION OF THE INVENTION

The FIGURE is a systems diagram showing the essential elements of the present invention, as incorporated in a digital copier which creates copies via an ink-jet printhead. Such a copier will include an input scanner, hereshown as 10, for scanning an original hard-copy image, and a system for controlling an ink-jet printhead, hereshown as 12. As is well known in the art, an input scanner typically includes a sensor array 11, such as a charge-coupled device (CCD) or CMOS sensor array, which typically includes a linear array of photosensors 40 for sampling the reflected light from a large set of small areas of an original sheet to be copied, such as known in the art of facsimile or multifunction devices. Similarly, the printhead control 12, which controls both the ejection of droplets from a printhead and incidentally one or more motors which control the position of the printhead relative to a sheet, is generally familiar in the art of ink-jet printing. Shown in FIG. 1 are stepper motors 30, 32, which control respectively the paper position and printhead position for a printhead depositing ink on a location on a copy sheet, i.e., the x,y location of the printhead relative to the sheet at a given time.

According to the present invention, an original document to be copied is scanned by input scanner 10. In a preferred embodiment of the invention, the original document is scanned twice, first in what is here called a "pre-scan," and then subsequently in detail. The purpose of the pre-scan is to quickly identify any white spaces larger than a predetermined area in the original image, which could result in image data eligible for "white-space skipping" to increase speed in the final printing step.

With reference to FIG. 1, in the pre-scan step, a relatively small amount of pre-scanned image data is derived from the input scanner 10, and stored in what is here called a pre-scan memory 14. According to a preferred embodiment of the present invention, the pre-scan image data derived from input scanner 10 is of low resolution, so that the original image can be pre-scanned at a maximum possible speed. For example, in one embodiment of the present invention, the sensor array 11 in input scanner 10 pre-scans the original image at a resolution of only 25 spots per inch, as compared to, for example, the 400 spots per inch resolution of typical digital-copier-quality scanning. This low-resolution image data can be obtained by sampling an evenly-distributed subset of sensors in the sensor array corresponding to the low resolution. At the same time, the sensor array 11 in input scanner 10 can be moved at a fairly high speed relative to the original image, such as from 20–30 inches per second. The purpose of this high-speed, low-resolution scanning, which yields only a relatively small amount of image data, is to retain just enough low-resolution image data in pre-scan memory 14 to determine whether there are any significantly large areas of contiguous white space in the original image.

The detection of such white spaces is carried out by a white-space detection algorithm 16. The details of the operation of such an algorithm may vary depending on particular circumstances, but basically, the function of the whites-pace detection algorithm 16 is to locate a sufficiently large number of contiguous low-resolution pixel areas in the original image to be indicative of a significant area of white space. The presence of a certain number of black pixel areas will of course be indicative of information-bearing image areas, such as text and of course text will include a significant proportion of white-space, so of course certain statistical properties of text must be taken into account when deciding whether a certain area is white space.

Other subtleties of determining whether there are areas of white space in a particular image include avoiding the error of finding white space in the presence of horizontal and vertical graphic lines, such as in a table or a grid in the image: it is conceivable that, if the horizontal and vertical lines consistently "miss" the pixel areas in the low-resolution data, the grid may be mistaken for white space and not printed in the final printing process. One possible technique for avoiding this error is to sample a large number of neighboring pixels along the sesnor array, and average their outputs: an output which is slightly darker than pure white will be indicative of the presence of some image activity in a particular area. Other techniques will be apparent, and the nature of such techniques may depend on the technology of the input scanner. For example, it may be possible to provide an arrangement of AND gates, or other hardware taps such as 42, for accepting signals contiguous or evenly-distributed sets of photosensors 40 in the sensor array 11. Further, with a CMOS system, it may be possible to extend the integration time for individual photosensors in the array (compared to the integration time for the high-resolution scan), so that individual sensors may be exposed to a relatively large area of the original image as the photosensors move relative to the original image.

Once the white spaces are detected by the white-space detection algorithm 16, the result of this process, a map of the original image indicating the locations of sufficiently large areas of white-space, can be entered into a white-space skipping algorithm here indicated as 18, which will be described in detail below.

Following the original pre-scan of an image, the original image is scanned again by input scanner 10. In this scan, the image data is recorded in detail at high (200-to-600-spi) resolution, in order to accurately render the image. This high-resolution scan can then yield data which is entered into an image processing system 20, which typically converts the original image data (which may include, for example, halftone data) into data which is more directly operative of an ink-jet printhead (such as incorporating, for example, error diffusion or dithering techniques). This "printhead-ready" data can then be stored in a buffer 22 until required by the printhead control 10.

Before the image data operative of the printhead control 12 is submitted from buffer 22, the white-space skipping algorithm 18, ultimately related to image data derived from the pre-scan, can be effectively applied to the data. Although the basic principle of white-space skipping in the printer context is well-known, the white-space skipping algorithm can be applied to the copier data in the present context in a variety of ways. For example, the image-processing system 20 can convert the original image data to an image format which simulates computer originated printing data such as, for example, a TIFF file, facsimile file, or JPEG-compressed data. Many such well-known image formats may include provision for adding "markers" at selected portions of the data, where directions for initiating a skipping algorithm would be readily incorporated.

Another technique for white-space skipping is to allow the skipping algorithm to react to the precise location of the printhead relative to the print sheet at a specific particular time in the printing process: the known locations of white spaces derived from the white-space detection algorithm 16 can be constantly compared to the instantaneous location of the printhead derived from printhead control 12 (note that the printhead control 12 can feed back the x,y coordinates of the printhead location, such as determined by the position of stepper motors 30, 32, to the skipping algorithm 18) and, where the printhead position approaches the location of skippable white-space, a white-space-skipping sequence can be initiated. Such a white-space skipping sequence, such as known in the art, may include changing the printhead direction before the printhead reaches the end of the sheet, or advancing the print sheet relative to the printhead without reciprocating the printhead, such as at the end of a printed text document. These techniques will increase the throughput speed of printing the desired page image.

Variations on the above-described technique will be apparent. In particular, the pre-scanning and scanning steps could be performed not with the same input scanner apparatus, but there could be provided two sensor arrays, a low-resolution array and a high-resolution array, over which the original document passes sequentially. Alternately, the pre-scanning and scanning steps could be performed simultaneously with one sensor array, with the pre-scan memory 16 "tapping" into a certain subset of sensors in the array via hardware such as 42, to obtain the necessary low-resolution image data.

Another type of variation to the above-described technique would be to employ a version of white-space skipping to situations which require multiple passes of a printhead over areas of a sheet intended to have certain types of images. For example, if the "normal" operation of the printer includes causing the printhead to pass twice over each area having a halftone image (such as to prevent excessive ink bleeding), or in a color printer in which a multi-color printhead must pass many times over the same area to lay down multiple primary-color inks, the pre-scan step could generally identify either areas having halftone images, or areas having color images. Then, areas which are neither halftone or color (such as black text) can be printed without multiple passes of the printhead over the area. In other words, the concept of "white space skipping" can thus apply to extra passes of a printhead over areas of the image to be copied which do not require these extra passes of the printhead.

In order to identify those areas of the original image which are, in this example, neither halftone or color, the low-resolution scan could include comparing signals from different primary-color-sensitive photosensors in array 11 to determine that all of the pixel-sized areas in a certain small area are all of one color; or, if the array is capable of adjusting the exposure or integration time of the photosensors, a halftone could be detected by detecting areas which are consistently within a certain range of reflectivity which would be close to neither all-white or all-black.

While the invention has been described with reference to the structure disclosed, it is not confined to the details set forth, but is intended to cover such modifications or changes as may come within the scope of the following claims.

We claim:

1. A method of operating a digital copier having an input scanner for scanning an original image, the input scanner including a sensor array, an ink-jet printhead, and a printhead control for moving the printhead relative to a copy sheet and causing the printhead to deposit ink at a predetermined location on the copy sheet, comprising the steps of:

scanning the original image to yield low-resolution image data;

identifying, based on the low-resolution image data, areas of contiguous white space of a predetermined minimal size in the original image;

scanning the original image to yield high-resolution image data; and printing a copy of the original image on the copy sheet with the printhead based on the high-resolution image data, the printing step including causing the printhead control to cause the printhead to skip a location on the copy sheet corresponding to an identified area of contiguous white space of a predetermined minimal size in the original image;

the step of scanning the original image to yield low-resolution image data including extending an integration time for individual photosensors in the array, compared to an integration time for the step of scanning the original image to yield high-resolution image data.

2. A method of operating a digital copier having an input scanner for scanning an original image, the input scanner including a sensor array, an ink-jet printhead, and a printhead control for moving the printhead relative to a copy sheet and causing the printhead to deposit ink at a predetermined location on the copy sheet, the printhead control further adapted to selectably cause the printhead to pass a predetermined number of times over an area of the copy sheet to render an image thereon, comprising the steps of:

scanning the original image to yield low-resolution image data;

identifying, based on the low-resolution image data, an area of contiguous space of a predetermined minimal size in the original image, said area of contiguous space requiring the printhead to pass fewer than said predetermined number of times over a location on the copy sheet to render the image in the area on the copy sheet;

scanning the original image to yield high-resolution image data; and printing a copy of the original image on the copy sheet with the printhead based on the high-resolution image data, the printing step including causing the printhead control to cause the printhead to pass fewer than said predetermined number of times over a location on the copy sheet corresponding to the area of contiguous space in the original image;

the step of scanning the original image to yield low-resolution image data including extending an integration time for individual photosensors in the array, compared to an integration time for the step of scanning the original image to yield high-resolution image data.

3. The method of claim 2, the sensor array including a first set of photosensors sensitive to a first color and a second set of photosensors sensitive to a second color, and the step of scanning the original image to yield low-resolution image data including comparing signals from the first set of photosensors and signals from the second set of photosensors to determine whether a color image is present in an area of the original image.

* * * * *